United States Patent [19]
Dorfman et al.

[11] Patent Number: 6,118,862
[45] Date of Patent: Sep. 12, 2000

[54] COMPUTER TELEPHONY SYSTEM AND METHOD

[75] Inventors: Alexander Dorfman, Brea; Michael Thomas Elliott, Mission Viejo; Hao-Yang Feng, Gardena; Jeffrey Wayne Pence, Fullerton, all of Calif.

[73] Assignee: Toshiba America Information Systems, Inc., Irvine, Calif.

[21] Appl. No.: 09/177,407

[22] Filed: Oct. 23, 1998

[51] Int. Cl.⁷ ...................................................... H04M 3/42
[52] U.S. Cl. ........................ 379/201; 379/88.22; 379/242
[58] Field of Search ............................... 379/67.1, 88.13, 379/88.16, 88.22, 90.01, 201, 242, 265, 266; 395/800.01, 800.28

[56] References Cited

U.S. PATENT DOCUMENTS

| | | |
|---|---|---|
| 5,452,341 | 9/1995 | Sattar . |
| 5,455,854 | 10/1995 | Dilts et al. ............................... 379/201 |
| 5,455,903 | 10/1995 | Jolissaint et al. . |
| 5,488,650 | 1/1996 | Greco et al. . |
| 5,644,631 | 7/1997 | Sattar et al. . |
| 5,717,747 | 2/1998 | Boyle, III et al. ....................... 379/201 |
| 5,724,406 | 3/1998 | Juster . |
| 5,737,393 | 4/1998 | Wolf . |
| 5,787,300 | 7/1998 | Wijaya . |
| 5,898,772 | 4/1999 | Connors et al. ......................... 379/265 |
| 5,917,903 | 6/1999 | Jolissaint ................................. 379/265 |

OTHER PUBLICATIONS

A copy of PCT Search Report.
"An Architectural Approach To Minimizing Feature Interactions In Telecommunications" by Zibman et al., IEEE/ACM Transactions On Networking, vol. 4, No. 4, Aug. 1996, pp. 582–595.

*Primary Examiner*—Scott L. Weaver
*Attorney, Agent, or Firm*—Morrison & Boerster

[57] ABSTRACT

A computer telephony server for simultaneously implementing a plurality of messaging applications is provided. The server includes a processor, a memory and a plurality of slots connected to the processor through a high-speed bus, each of the plurality of slots being adapted to receive an interface card for connecting the server to an external resource. A plurality of primary sessions are provided, each of which have a first thread of execution on the processor and control a first subset of the memory and at least one external resource. A plurality of secondary sessions, each corresponding to one of the primary sessions, is also provided. Each secondary session has a second thread of execution on the processor and controls a second subset of the memory. The primary session delegates a set of system resources to its corresponding secondary session and monitors the secondary session's behavior. In addition, the primary session operates to recover the set of system resources delegated to the secondary session upon the termination of the secondary session.

20 Claims, 13 Drawing Sheets

COMPUTER TELEPHONY SYSTEM AND METHOD

BACKGROUND OF THE INVENTION

1. Field of the Invention

The present invention relates to computer telephony systems and methods, and more particularly to a stable software architecture for a computer telephony server that operates to preserve the availability of hardware resources.

2. Description of the Related Art

Computer telephony systems, i.e., systems that integrate computers and telephones, are widely used in the art. By combining the power of computers with telephones and messaging services, computer telephony systems have become powerful business tools. The computer telephony systems known in the art are capable of combining voice messaging, facsimile messaging, paging, electronic mail, and other messaging services, through implementations such as interactive voice response systems and unified messaging.

Recently, there have been rapid advances in computer hardware, software and communications systems. As a result, businesses relying on computer telephony systems are confronted with choosing between expensive upgrades in hardware and software or losing a competitive advantage. In addition, businesses also require a computer telephony system that can be easily customized to meet their business needs. Thus, there is a need in the art for a computer telephony system that is extendible and open, flexible and robust. A computer telephony system would be extendible and open if new applications and hardware resources could be added without requiring major modifications of the computer telephony system. A flexible computer telephony system would be compatible with multiple hardware platforms and be easily customizable, allowing the computer telephony system to be utilized for various needs. Finally, a robust computer telephony system would provide a stable environment for running various computer telephony applications and interfacing various hardware resources.

During operation, the software of the computer telephony server interfaces with available hardware resources, such as telephone lines, to implement call processing functions. In one method known in the art, a thread is generated for each telephone line. Each thread controls its telephone line and executes commands and software applications associated with the telephone line. However, a bug in one of the software applications executed on the thread (or another cause of abnormal termination) could cause the thread to crash, tying up the telephone line and other system resources under its control. As a result, these system resources could be unavailable for further processing unless the crash is detected and the system resources are properly recovered.

SUMMARY OF THE INVENTION

The present invention is directed to a computer telephony system and method that is extendible and open, robust and flexible. A stable software architecture for a computer telephony server is provided. The software architecture operates to preserve the availability of hardware resources connected to the computer telephony server.

In one embodiment of the present invention, a computer telephony server for simultaneously implementing a plurality of messaging applications includes a processor, a memory, and a plurality of slots connected to the processor through a high-speed bus. Each of the plurality of slots is adapted to receive an interface card for connecting the computer telephony server to an external resource. A software architecture operating on the computer telephony server includes a multitasking operating system for controlling the server, a plurality of device drivers for interfacing the external resources with the multi-tasking operating system, and an event-driven, object-oriented application framework running on the multitasking operating system. The application framework includes a plurality of global objects, including a configuration manager for setting system wide properties, an internal database manager and a resource manager for allocating the physical resources of the server.

A plurality of primary sessions are implemented on the server, each including a first thread of execution on the processor and controlling a first subset of the memory and at least one system resource. Each primary session runs an idle application which controls its respective primary session. The idle application operates to detect call processing events relating to the at least one system resource controlled by its respective primary session. When a call processing event is detected, the idle application creates a secondary session which includes a second thread of execution on the processor and controls a second subset of the memory. In addition, the idle application delegates a set of resources, including the at least one system resource, to the secondary session. The idle application monitors the secondary session it creates, and operates to recover the set of delegated resources when the secondary session terminates, thereby preserving the availability of the at least one system resource for use with subsequent call processing events.

The present invention also includes a method for providing a stable runtime environment in a computer telephony system having a computer including a processor and a memory and running a multitasking operating system is provided. First, at least one system resource is selected. A primary session for controlling the system resource is then created. The primary session includes a first thread of control on the processor and controls a first subset of the memory. The primary session further includes a scenario defining a behavior of the primary session through an event-application map. Next, an idle application for detecting a call processing event relating to the selected system resource is provided, and it is executed on the primary session. The idle application then waits for a call processing event in accordance with the scenario. When a call processing event is identified, a secondary session is created for executing the application associated with the call processing event in accordance with the scenario. The secondary session includes a second thread of control on the processor and controls a second subset of the memory and the system resource. The idle application executing on the primary session then monitors the behavior of the secondary session. When the secondary session terminates, the idle application operates to recover the system resource, thereby preserving the availability of the at least one system resource for use with subsequent call processing events.

A more complete understanding of the computer telephony system and method will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF PREFERRED EMBODIMENTS

In the detailed description that follows, it should be appreciated that like element numerals are used to describe like elements that are illustrated in one or more of the figures.

Figure 1:
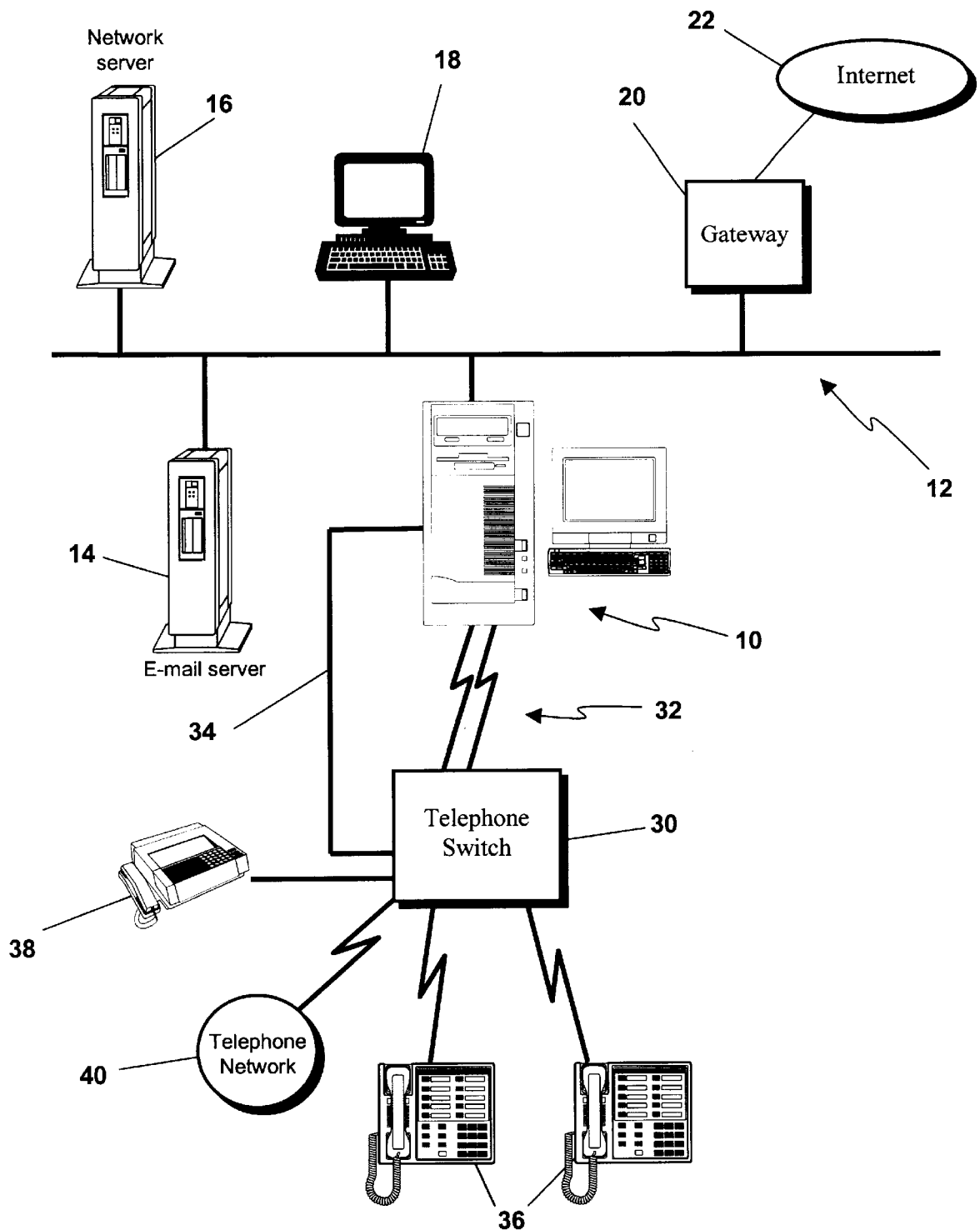
FIG. 1 illustrates a computer telephony system of a preferred embodiment of the present invention.

A computer telephony server (CT server) in accordance with a preferred embodiment of the present invention will now be described with reference to FIG. 1. A CT server 10 is connected to a local area network (LAN) 12, allowing the CT server 10 to communicate with other devices connected to the LAN 12, including an electronic mail server 14 (e-mail server), a network server 16, a workstation 18, and a gateway 20 for providing access to a remote network 22 such as the Internet 22. In the preferred embodiment, the LAN 12 is an Ethernet network; however, other network protocols can also be utilized. It should also be appreciated by those having ordinary skill in the art that additional devices can be connected to the LAN 12, and that the LAN 12 does not necessarily include all of the devices illustrated in FIG. 1.

The CT server 10 is also connected to a telephone switch 30. In the preferred embodiment, the telephone switch 30 is a private branch exchange (PBX), but the telephone switch 30 can also be a key telephone system, public switched telephone network or other telephone systems known in the art. As known in the art, a PBX is a telephone switching system that interconnects telephone extensions to each other, as well as to an outside telephone network. The telephone switch 30 is adapted to perform a plurality of functions including least-cost routing for outside calls, call forwarding, and conference calling. In a preferred embodiment, the telephone switch 30 is connected to the CT server 10 through phone connections 32 and a Simplified Message Desk Interface (SMDI) serial link 34. The phone connections 32 provide telephone services between the CT server 10 and the PBX 32. In the preferred embodiment, the phone connections 32 are analog phone lines, but digital lines can also be used. The SMDI serial link 34 provides a high-speed communications link between the CT server 10 and the telephone switch 30. The telephone switch 30 can also be connected to a plurality of phones 36, fax machines 38 and other telephone networks 40.

Figure 2:
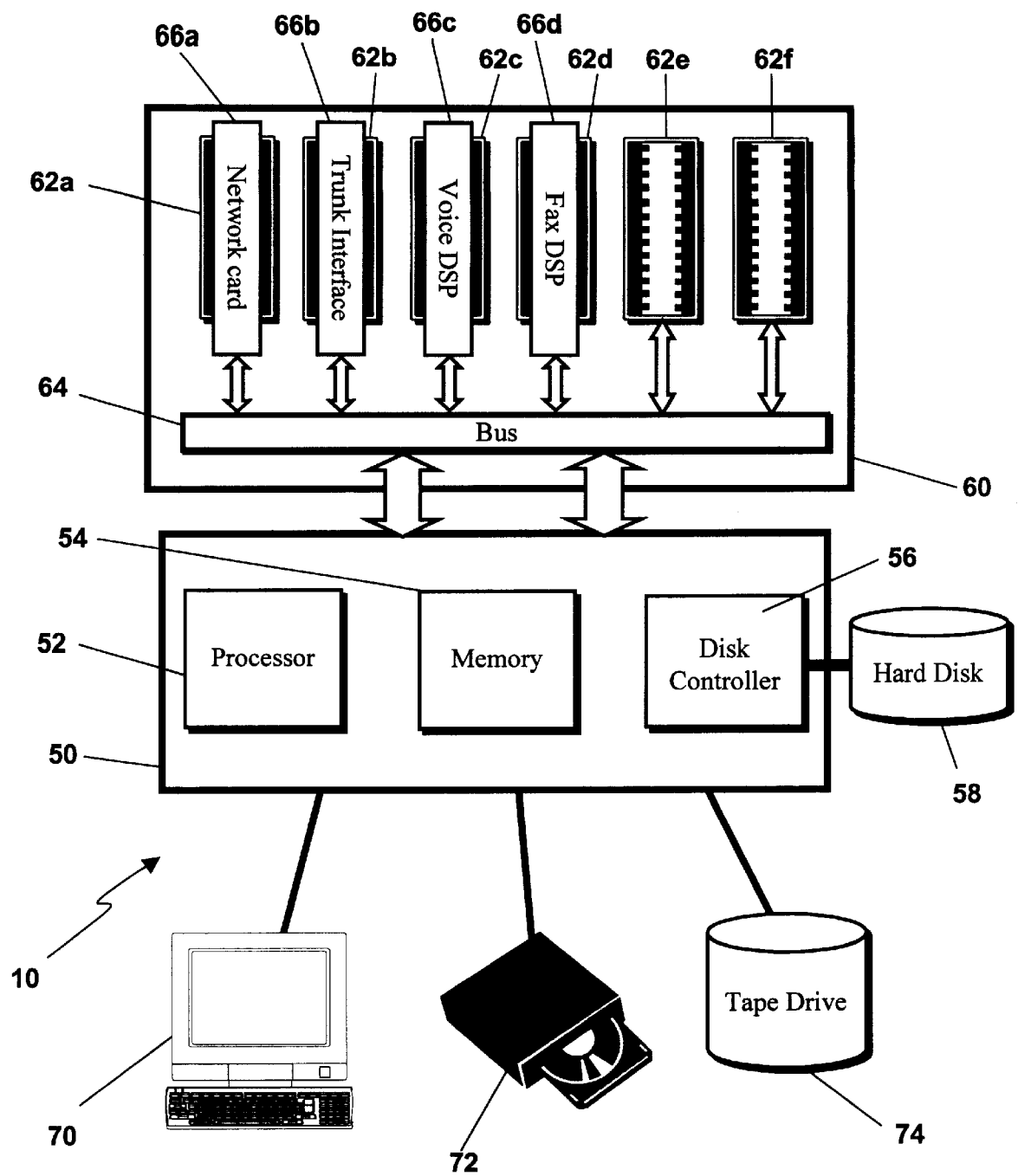
FIG. 2 is a block diagram illustrating the hardware components of a preferred embodiment of a computer telephony server.

A preferred embodiment of the CT server 10 hardware will now be described with reference to FIG. 2. The CT server 10 includes a processor board 50 and a backplane 60. The processor board 50 is a Single Board Computer (SBC) which includes a processor 52, a memory 54 and a disk controller 56 which is coupled to a hard drive 58. In a preferred embodiment, the processor 52 is a Pentium or Pentium compatible processor; however, other processors may also be utilized. The memory 54 includes a ROM and at least 32 Mb of RAM. The disk controller 56 controls the hard drive 58, preferably based on an IDE interface, which is utilized for storing data such as voice mail messages. The processor board 50 is connected to a plurality of devices, including a terminal 70 to allow administration of the CT server 10, a CD-ROM 72 and a tape drive 74 for providing backup storage for the CT server 10.

The backplane 60 includes a plurality of slots 62a–f, which are connected to a bus 64. In a preferred embodiment, the plurality of slots 62a–f are Industry Standard Architecture (ISA) slots and are adapted to accept ISA plug-in boards such as a network card 66a for interfacing the CT server 10 with the LAN 12, a trunk interface 66b for interfacing the phone connections 32 between telephone switch 30 and the CT server 10, a voice digital signal processor (DSP) 66c and a fax DSP 66d. Alternatively, the slots 62a–f may be Peripheral Component Interconnect (PCI) slots for connecting PCI cards, or utilize other interface standards as known in the art.

The processor board 50 is adapted to be received into a slot (not shown) on the backplane 60, thereby connecting the processor board 50 to the backplane 60. When connected, the processor board 50 communicates with the installed devices in slots 62a–62f through a bus 64. In a preferred embodiment, the bus 64 is a high-speed Signal Computing bus (SCbus), which provides a 131 Mbps data path having up to 2,048 time slots, the equivalent of 1,024 two-way voice conversations at 64 Kbps. However, other bus standards may also be implemented, such as standards from the Enterprise Computer Telephony Forum (ECTF) or H.110 from the Consultative Committee on International Telephone and Telegraph (CCITT).

Processor boards and backplanes, such as processor board 50 and backplane 60 described above, are known in the art and are available from companies such as Dialogic Corporation, Parsippany, N.J. In addition, it should be appreciated that other hardware configurations could be utilized. For example, the backplane 60 of the preferred embodiment is a passive backplane, but the CT server 10 could also be implemented with an active backplane. However, as known in the art, the utilization of passive backplanes and single board computers facilitates an open, modular hardware platform.

Figure 3:
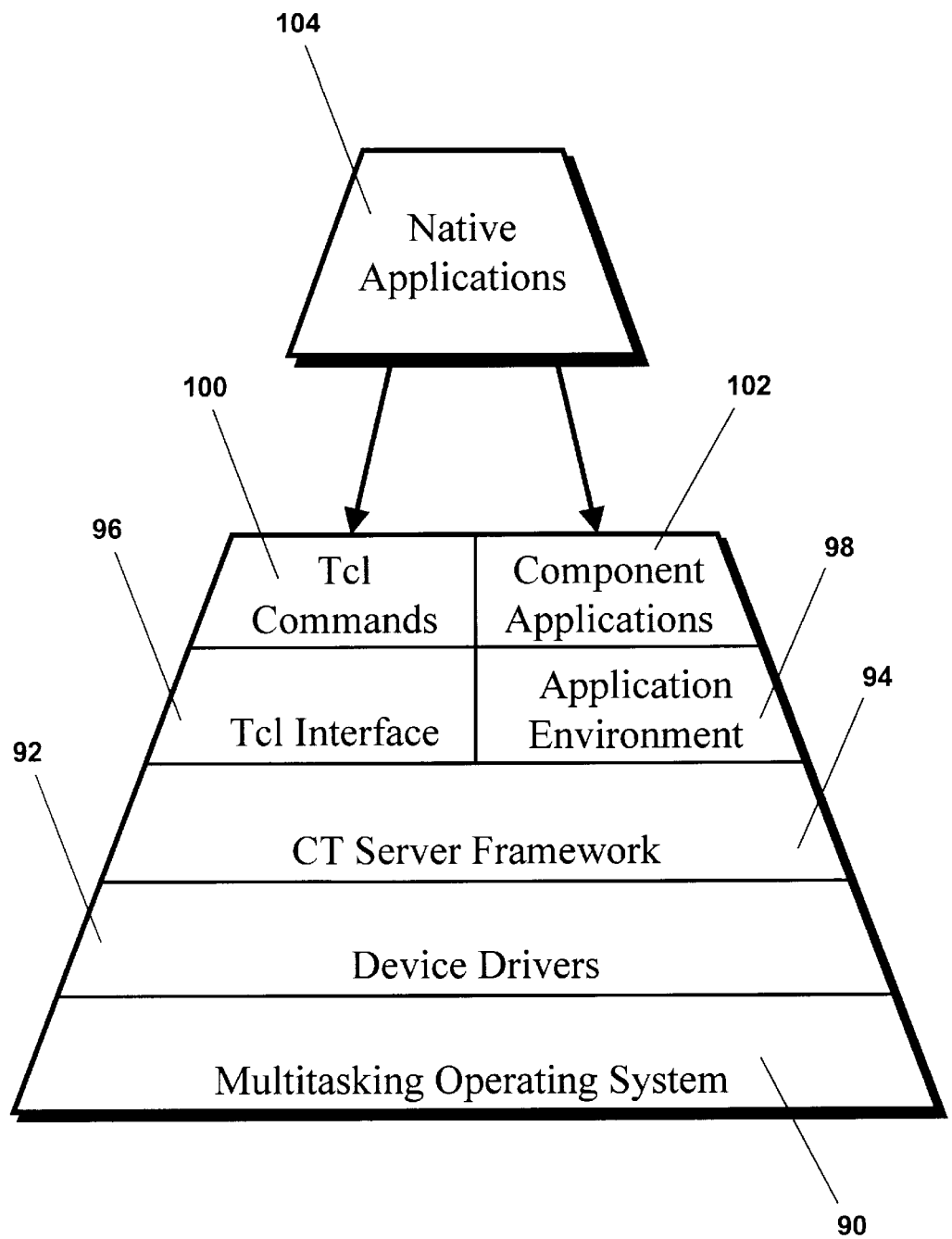
FIG. 3 illustrates a software architecture hierarchy of a computer telephony server of a preferred embodiment.

A preferred embodiment of the CT server 10 software will now be described with reference to FIG. 3. At the lowest level, the CT server 10 runs a multitasking operating system 90, such as Windows NT by Microsoft Corp. Windows NT is a 32-bit operating system that includes features such as peer-to-peer networking, preemptive multitasking, multithreading, multiprocessing and fault tolerance. It should be apparent that other multitasking operating systems, such as UNIX, can of course be utilized. A second level of software, running on the operating system 90, includes device drivers 92. Generally, the device drivers 92 are provided by the manufacturer of individual hardware devices and are utilized to link the hardware devices to the operating system 90.

A third level of software is a CT server framework 94. The CT server framework 94 is an event-driven, object-oriented software environment used for the development and operation of server-based CT Integration applications such as voice mail and interactive voice response (IVR) systems. As will be appreciated by those having ordinary skill in the art, the CT server framework 94 is a unique application interface and infrastructure for the development of these CT server applications, providing extendibility, openness, robustness and flexibility. A more detailed discussion of the CT server framework 94 will be provided below.

A fourth level of software includes a Tool Command Language (Tcl) interface 96 and an application environment 98. As known in the art, Tcl is an interpreted script language that is used to develop applications, and provides an interface into applications that are compiled with Tcl functions. The Tcl interface 96 provides an environment to execute Tcl scripts. It should be apparent that other scripting languages and interfaces can of course be utilized. The application environment 98 provides a setting for executing compiled component applications, and provides a mechanism to allow new component applications to be added without requiring modifications to the main executable. As known in the art, Windows NT provides a software architecture called Component Object Model (COM) which allows applications to be built from separate binary components. In particular, COM provides a mechanism to construct and register objects dynamically, thus eliminating the need for statically linking with object code. The application environment 98 will locate new objects from a registry and load them into the executable's environment as needed.

A fifth level of software includes Tcl commands 100 and component applications 102. The Tcl commands 100 include script commands for performing basic system functions including: (a) play a message; (b) record a message; (c) open database; etc. The component applications 102 include compiled applications for performing various call processing functions. The sixth level of software includes native applications 104, which group one or more Tcl commands 100 and/or component applications 102 to perform large scale CT applications, including call processing, integrated messaging and IVR applications. As will be discussed in detail below, the CT server 10 provides a structure and an environment that allows for efficient creation, use and modification of native applications 104, through Tcl scripts and event-application maps.

Figure 4:
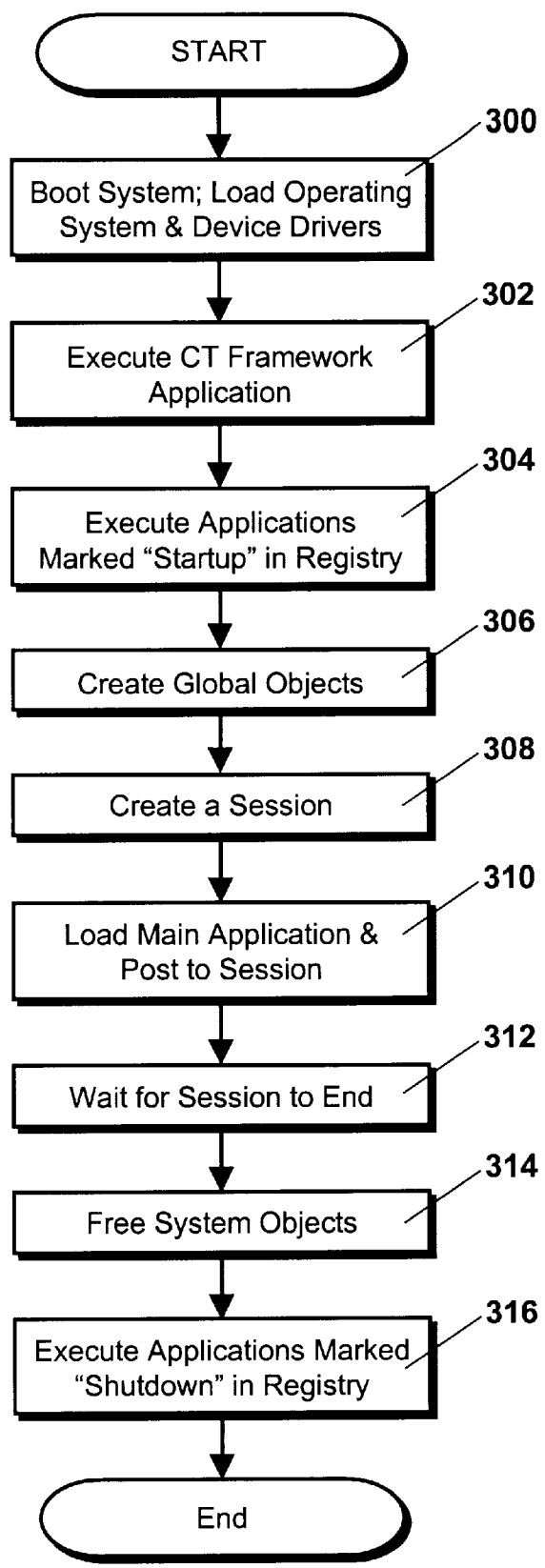
FIG. 4 is a flow diagram illustrating the operation of a preferred embodiment of a computer telephony server.

A preferred embodiment of the operation of the CT server 10 and the framework 94 will now be described with reference to the flow diagram of FIG. 4. First, at Step 300 the CT server 10 boots, loading the multitasking operating system 90 and then the device drivers 92. At Step 302, a CT framework application is started. The CT framework application can be executed automatically when the system boots; however, in the preferred embodiment, a Services Control Panel Applet is first executed and provides the user with an option menu, including the option of executing the CT framework application. The CT framework application executes all applications marked "startup" in the registry at Step 304. The registry is a database including configuration settings, and in the preferred embodiment, is part of Windows NT. As known in the art, information is stored in the registry that controls Windows itself, and application programs (such as the CT framework application) can store their own settings in the registry. The "startup" settings for the CT framework application includes programs for checking the integrity of internal databases and verifying the reasonableness of various configurations.

Next, at Step 306 the CT framework application creates global system objects including a configuration manager 110, a resource manager 120, a job queue 130 and a database manager 140 (see FIGS. 5–11). In the preferred embodiment, additional global objects are also created, for example, a scheduler object is created to execute scheduled applications at a certain date and time, and a plurality of event objects are created including a shut-down event for terminating the execution of the CT server framework 94.

Figure 5:
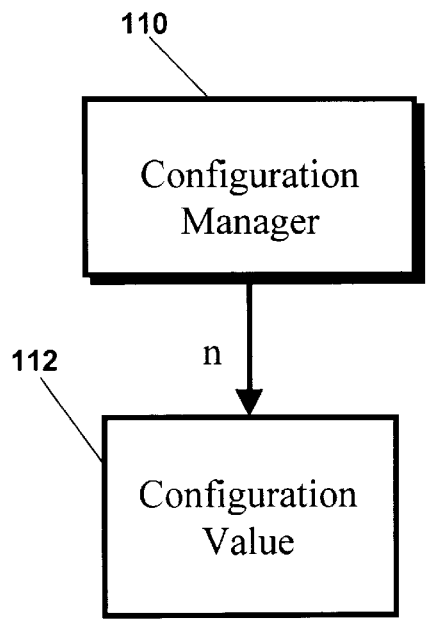
FIG. 5 is a diagram illustrating a configuration manager global object of a preferred embodiment.

As illustrated in FIG. 5, the configuration manager 110 is a global object that includes a plurality of configuration values 112. The configuration values 112 maintain global system information that is used for setting system wide properties (e.g., timeout values) and generic properties and values (e.g., establishing a protocol between the CT server 10 and the telephone switch 30). The configuration manager 110 also provides additional services such as application allocation, Tcl command registration and Tcl interpreter creation.

Figure 6:
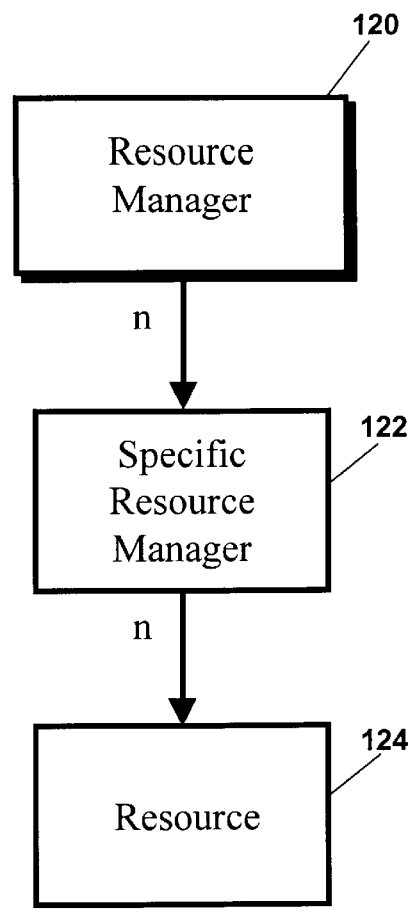
FIG. 6 is a diagram illustrating a resource manager global object of a preferred embodiment.

As illustrated in FIG. 6, the resource manager 120 is a global object that manages the physical resources of the CT server 10. The resource manager 120 includes a set of specific resource managers 122, each of which manages a set of specific resources 124. For example, the CT server 10 may include telephone line resources and fax resources. A telephone line resource manager would regulate the use of each telephone line connected to the CT server 10, while a fax resource manager would regulate the use of each fax device connected to the CT server 10. In a preferred embodiment, a request to use a specific resource will be made through the global resource manager 120, which in turn, communicates directly with the relevant specific resource manager 124.

Figure 7:
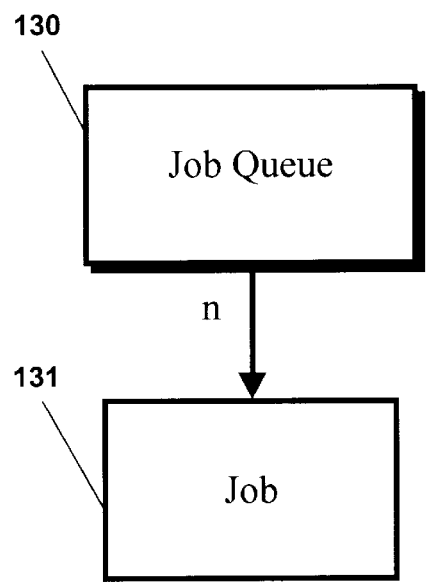
FIG. 7 is a diagram illustrating a job queue global object of a preferred embodiment.

As illustrated in FIG. 7, the job queue 130 is a global object that includes a set of jobs that are waiting to be executed. In the preferred embodiment, the job queue 130 works with the resource manager 120 and is used to support asynchronous applications that require a CT resource. For example, if a user has programmed the system to place an outgoing call to his home whenever a message is left in his mailbox, a job will be created and submitted to the job queue 130 for execution when a message is received. Before executing the job, the job queue 130 will request an idle line from the resource manager 120 on which to place the outgoing call. If a line is available, the job queue 130 creates a session to run the task and to take control of the line. As will be discussed in greater detail below, the session defines a call processing environment that includes a thread of control on the processor 52 and a subset of the memory 54. When the job is finished, the line is returned to an idle state, and the resource manager 120 is notified that the line is once again available. Other waiting jobs in the job queue 130 may then be executed on that line.

Figure 8:
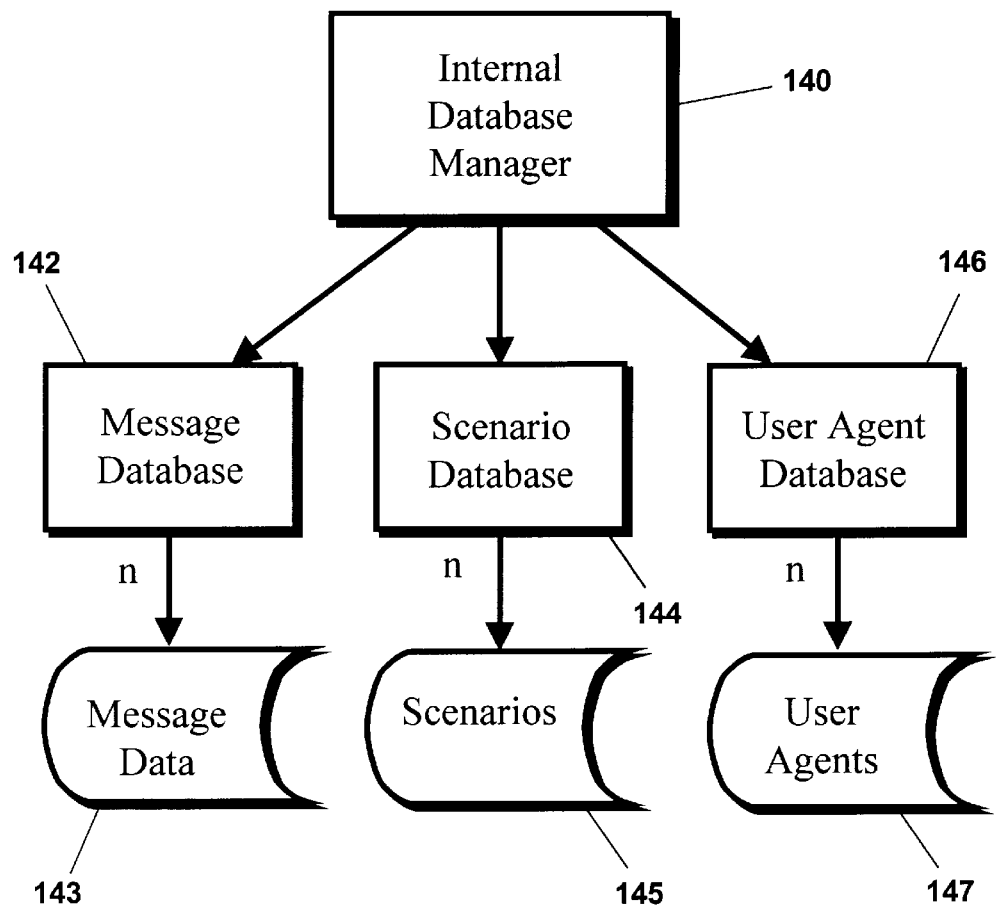
FIG. 8 is a diagram illustrating an internal database manager global object of a preferred embodiment.

The internal database manager 140, illustrated in FIG. 8, is a global object that controls databases utilized by the CT server 10, including a message database 142, a scenario database 144, and a user agent database 146. In the preferred embodiment, the databases are represented as a set of two-dimensional tables, each having an index key. The indexes are stored in hash tables that are built during system startup. The internal database manager 140 provides full multithreading access to the data within a single process with minimal overhead. In the preferred embodiment, only one instance of the internal database manager 140 is present on the system. Other components gain access to the internal database manager 140 through a pointer, also stored as a global object.

The message database 142 includes a plurality of messages 143. Each message 143 includes a message header and may have a message body with one or more components including voice data, fax data, and arbitrary binary data. The message header includes information specific to the message's target user. In a preferred embodiment, components can be shared across different messages and message bodies can be shared across different users.

Figure 9:
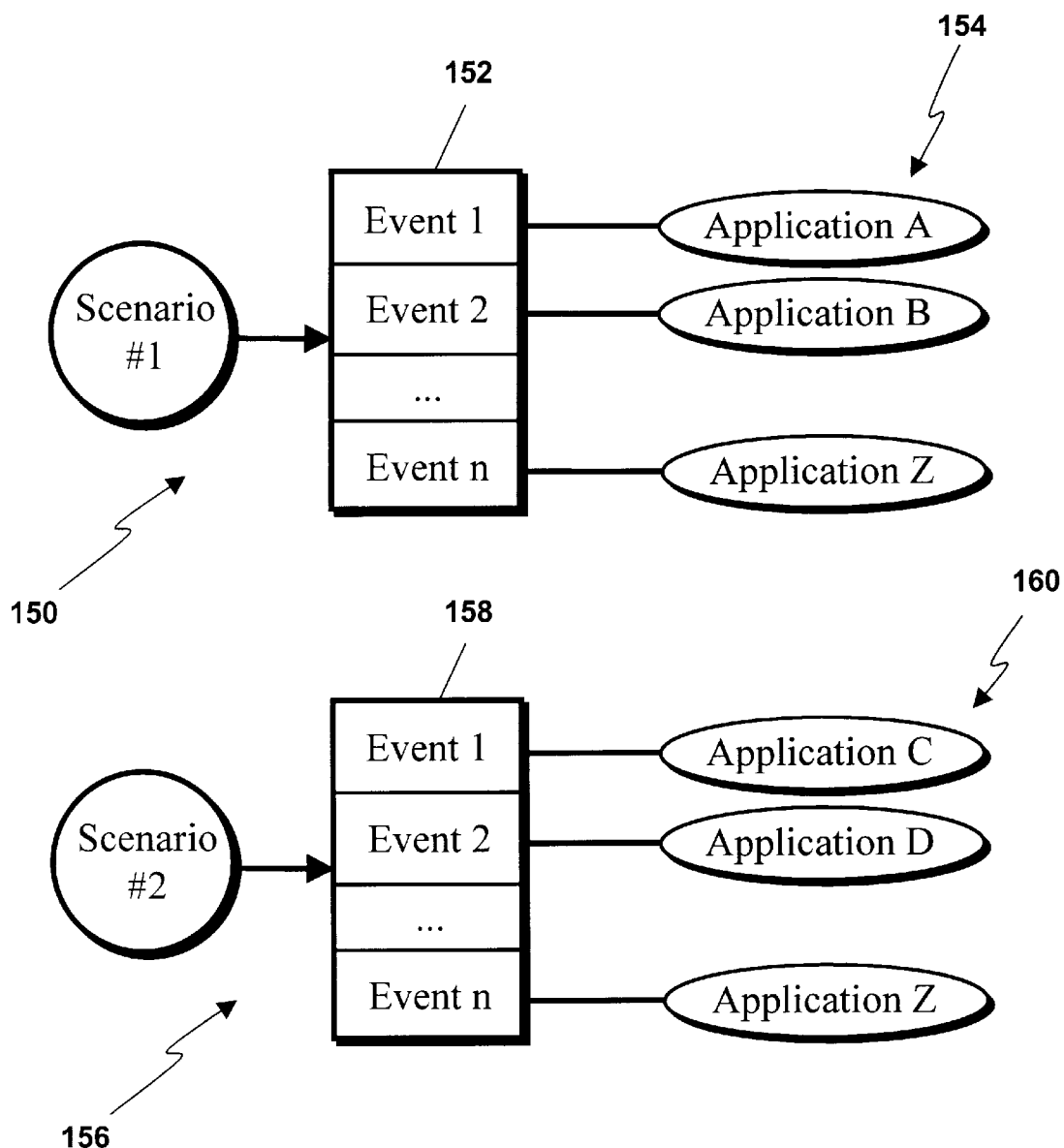
FIG. 9 is a diagram illustrating scenarios of a preferred embodiment.

The scenario database 144 includes data for a plurality of scenarios 145. A scenario 145 is an ordered collection of event maps, mapping each event in the scenario to an application identifier. As illustrated in FIG. 9, the same event may be mapped to different applications in different scenarios. A first scenario 150 includes a list of events 152, each of which is mapped to one of a plurality of applications 154. Thus, if the first scenario 150 is being utilized, on the occurrence of "Event 1," "Application A" will be executed. A second scenario 156 includes a list of events 158, each of which is mapped to one of a plurality of applications 160. When the second scenario 156 is being utilized, on the occurrence of "Event 1," "Application C" will be executed. As should be apparent, the use of scenarios allows the overall system to have different behaviors, based upon the type of scenario currently being used. In addition, it should be noted that the list of events 158 may be different than the list of events 152.

In a preferred embodiment, two types of scenarios 145 are supported: system scenarios and user scenarios. Only one system scenario is utilized on a CT server 10 at a time, and it defines the default behavior of the system. As will be discussed below, user scenarios are defined for individual user agents. In addition, it is preferred that each scenario 145 also have a scheduling record that is capable of making a given event map active or inactive based on a current date/time. For example, the CT server 10 can be utilized by a business that operates between 9 a.m. and 5 p.m. During these business hours, a "new call" event (i.e., a call from an outside line) may be mapped to an application that forwards the call to an operator. However, outside of business hours, it may be beneficial to have this "new call" event mapped to an auto attendant application.

Figure 10:
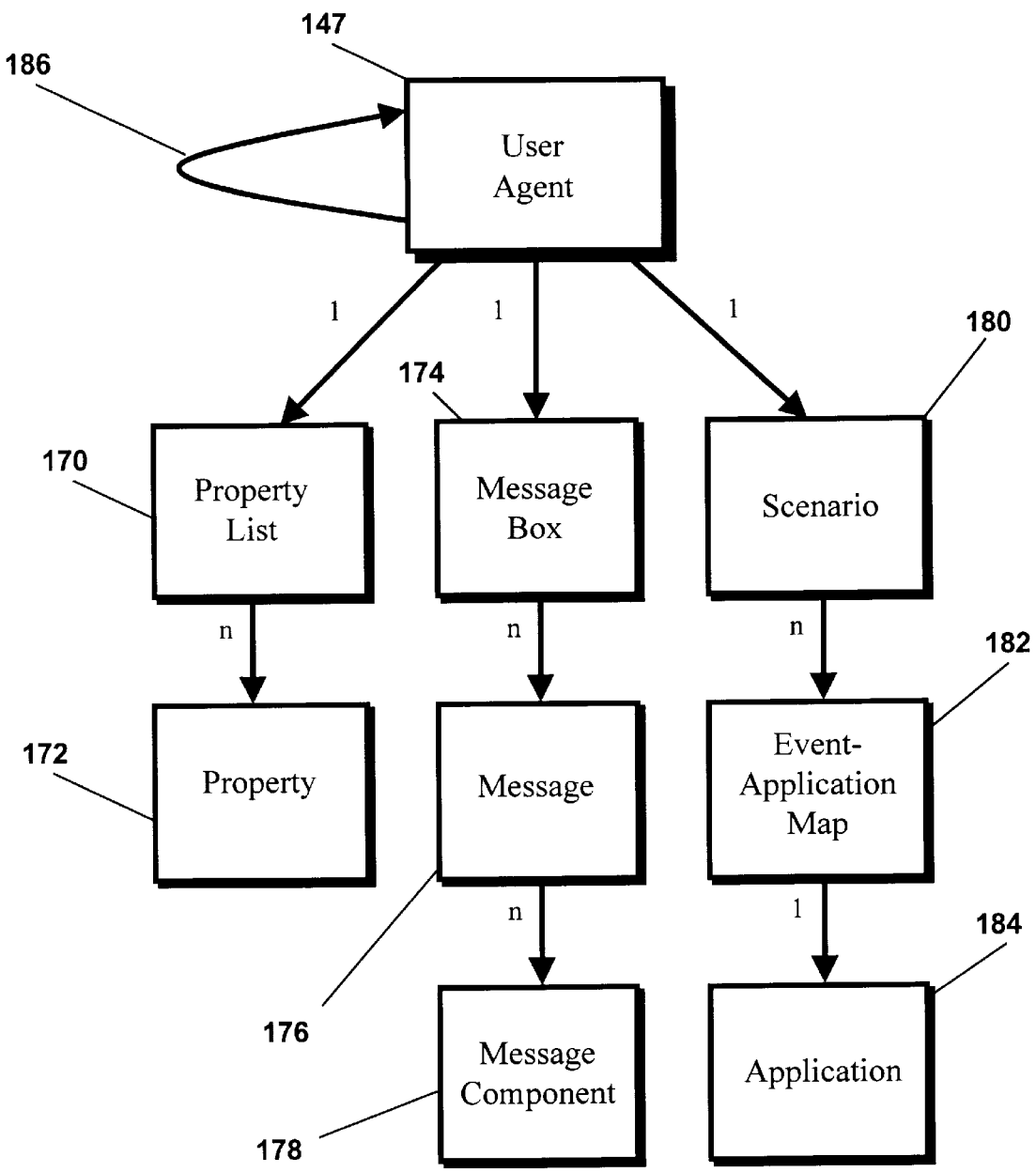
FIG. 10 illustrates a preferred embodiment of a user agent.

The user agent database 146 includes data for a plurality of user agents 147. Each user agent 147 represents a known user of the CT server 10, for example, a voice mail box. As illustrated in FIG. 10, in a preferred embodiment each user agent 147 includes a property list 170, a message box 174 and a scenario 180. The property list 170 includes a set of properties 172 that are used to configure the user agent 147. The set of properties 172 include fixed properties and named properties. Fixed properties include required information that is usually specific for a given user agent, e.g., security access code, security attributes, scenario ID, etc. For performance reasons, the database uses lazy initialization of the objects of user agent 147, so the named properties are only loaded when the access to them is requested. The message box 174 includes messages 176 associated with the user agent 147, each message 176 including at least one message component 178. The messages 176 may be voice mail messages, fax messages, e-mail messages, or any other message type supported by the CT server 10. The scenario 180 is a user scenario, and includes a plurality of event-application maps 182, each of which maps an event to one application 184. In a preferred embodiment, the user agent 147 may only subscribe to one scenario 180, with the user scenario automatically inheriting the event-maps of the system scenario.

The user agent 147 is also capable of inheritance, as illustrated by reference numeral 186. The user agent 147 can have a parent or template from which it inherits named properties from other user agents. Multilevel hierarchy is also supported. The user agent 147 can override any named property maintained by its parent, and new named properties can be added to the user agent 147 at any time.

Figure 11:
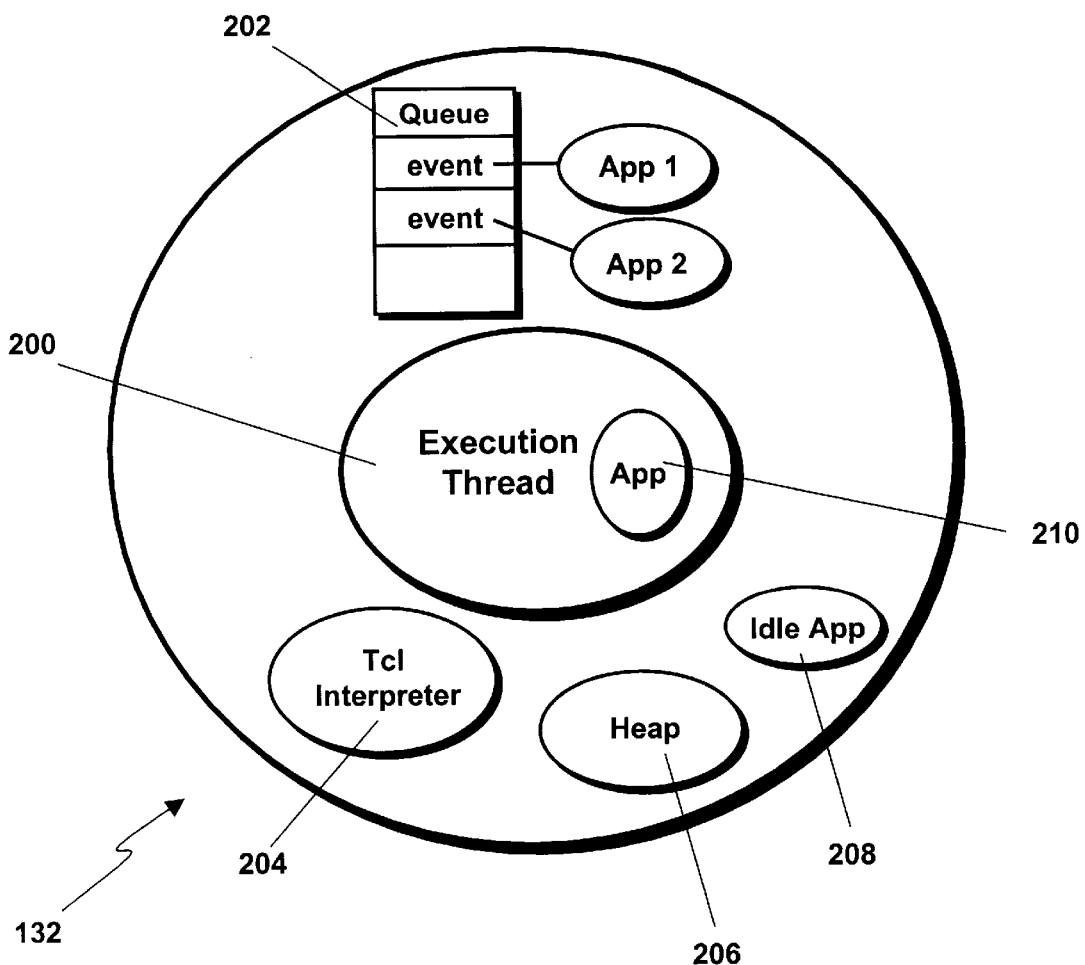
FIG. 11 is diagram illustrating the basic components of a session in a preferred embodiment.
Figure 12:
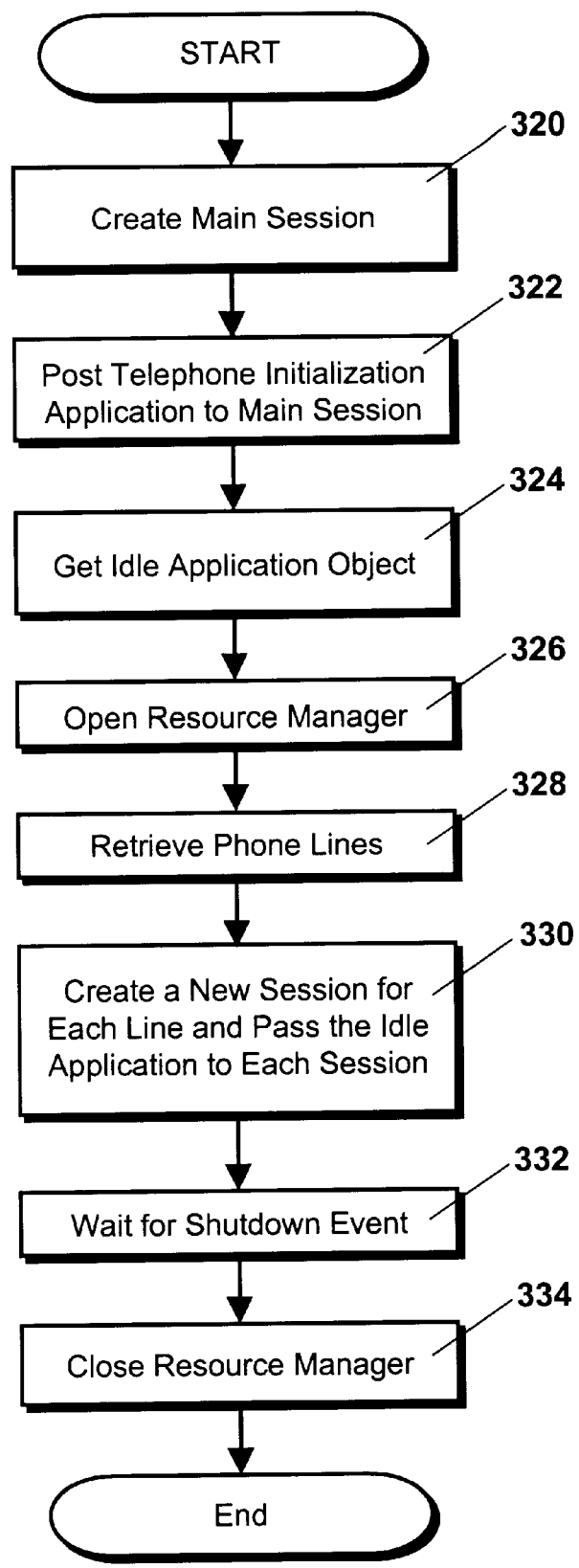
FIG. 12 is a flow chart illustrating the basic flow of a voice mail application in accordance with a preferred embodiment of the present invention.
Figure 13:
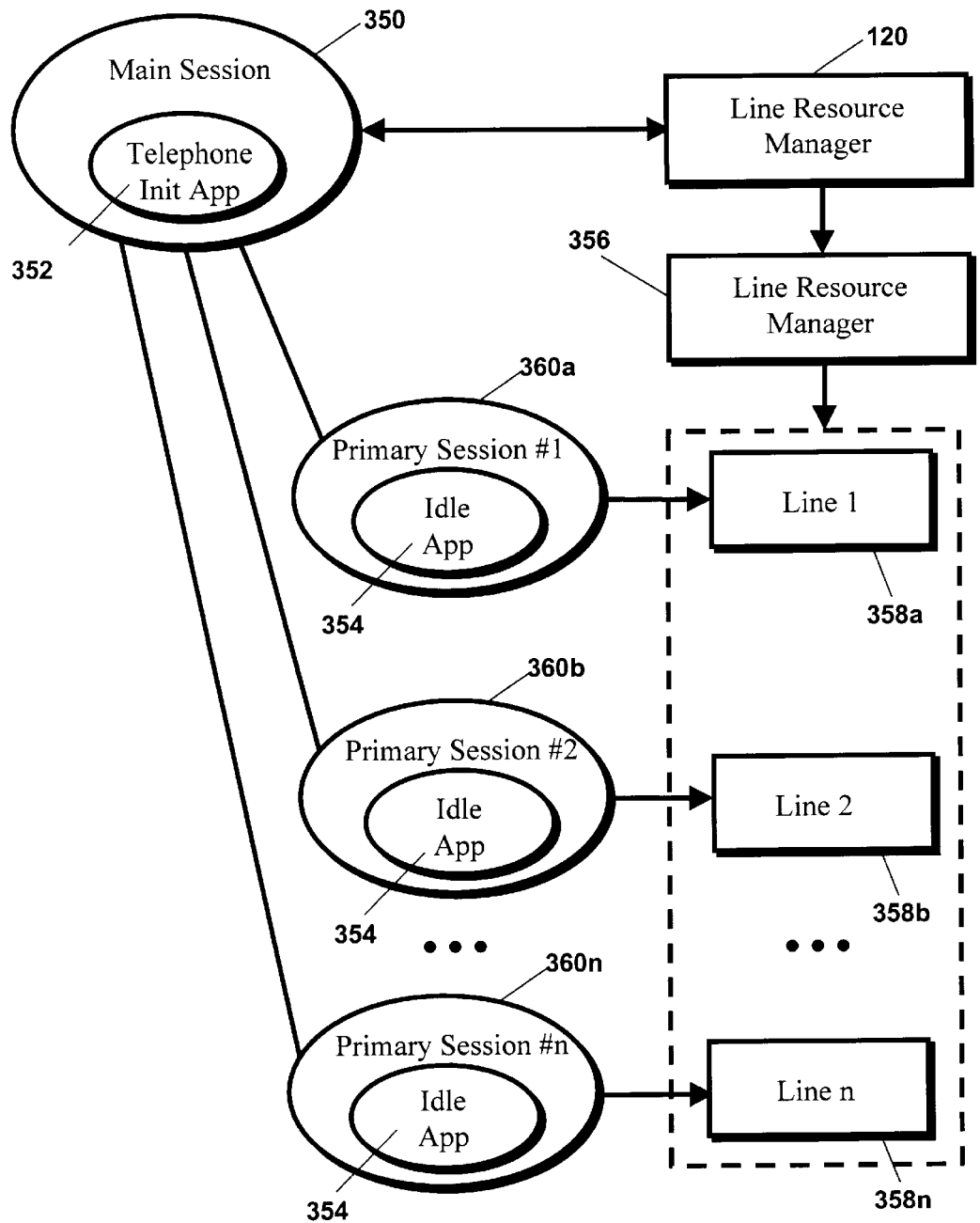
FIG. 13 is a diagram illustrating an example of the relationship between the main session, the primary sessions and line resources.

Referring back to FIG. 4, after the global objects are created at step 306, a main session is created at Step 308 to provide a clean runtime environment for a main application, such as an initialization application, which is loaded and posted to the main session at Step 310. A "session" binds together an execution context and system resources. The components of a preferred embodiment of a session 132 are illustrated in FIG. 11. The execution context includes an execution thread 200 on the processor 52 and a heap 206 which is a subset of the memory 54. In addition, the session 132 includes a session queue 202, a Tcl interpreter 204, and an application, such as an idle application 208.

When the session 132 is created, the session queue 202 begins running. The session queue 202 can be used by other sessions to send messages into session 132. Initially, the session queue 202 waits for a message to arrive with an application to be executed on the session 132, and if one does not arrive within a predetermined time-out period, the session 132 exits. In the preferred embodiment, the main application locates the session application from the configuration manager 110 and sends this application to the session queue 202. The application will then be executed on the session 132 and may utilize any resources allocated by the session 132, such as telephone lines, voice processing, fax processing, etc.

In the preferred embodiment, each session 132 may be allocated a set of resources. The resources allocated to the session 132 will be released automatically when the session 132 terminates, e.g., through normal termination or if the application executing on the session 132 crashes. In addition, the session 132 may "delegate" the use of some or all of its resources to a second session. This second session may utilize the delegated resources as if the resources had been allocated to the second session. However, in the preferred embodiment, the second session can release resources allocated to the second session, but cannot release delegated resources (i.e., those resources allocated to other sessions). When the second session terminates, the session 132 will regain control of the resources it delegated to the second session.

Referring back to FIG. 4, after the main application is posted to the main session, the CT framework application then waits for the main session to end at Step 312. When the main session ends, the CT framework application frees all system objects at Step 314 and executes all applications marked "shutdown" in the registry at step 316, to shutdown the CT server 10.

An example of the operation of a voice mail application running on the CT server 10 will now be illustrated with reference to FIGS. 12–15. Although a voice mail application is illustrated, It should be apparent that other applications can also be run on the CT server 10. The basic implementation of a voice mail application is provided in the flow diagram of FIG. 12 with reference to the block diagram of FIG. 13. First, a main session 350 is created at step 320 by the CT server framework. At step 322, the application name of a telephone initialization application 352 is read from the configuration manager and sent to the session queue of session 350 where it is executed on the execution thread of main session 350. The telephone initialization application 352 gets an idle application 354 from the configuration manager at step 324.

At step 326, the resource manager 120 is contacted, and a specific resource manager 356, for managing a plurality of telephone lines, is opened. The telephone initialization application 352 then retrieves the number of telephone lines 358a–n available from the resource manager 120 at step 328. A plurality of primary sessions 360a–n are created, one for each telephone line, and the idle application 354 is passed as a message into each primary session 360a–n. When the idle application 354 is received in one of the primary sessions 360a–n, it will execute the idle application 354 which causes the primary session 360 to wait for an event to occur on its respective telephone line 358. Next, the telephone initialization application 352 running on the main session 350 waits for a shutdown event to be signaled at step 332. When a shutdown event occurs, the resource manager 120 sends a line shutdown event to all telephone lines 358a–n causing all idle applications 354 to stop executing. The resource manager 120 will then wait for all telephone lines 358a–n to be released by their respective primary sessions 360a–n or it will take control of the line after a predetermined amount of time. When each idle application 354 stops executing, its respective primary session 360 terminates.

Figure 14:
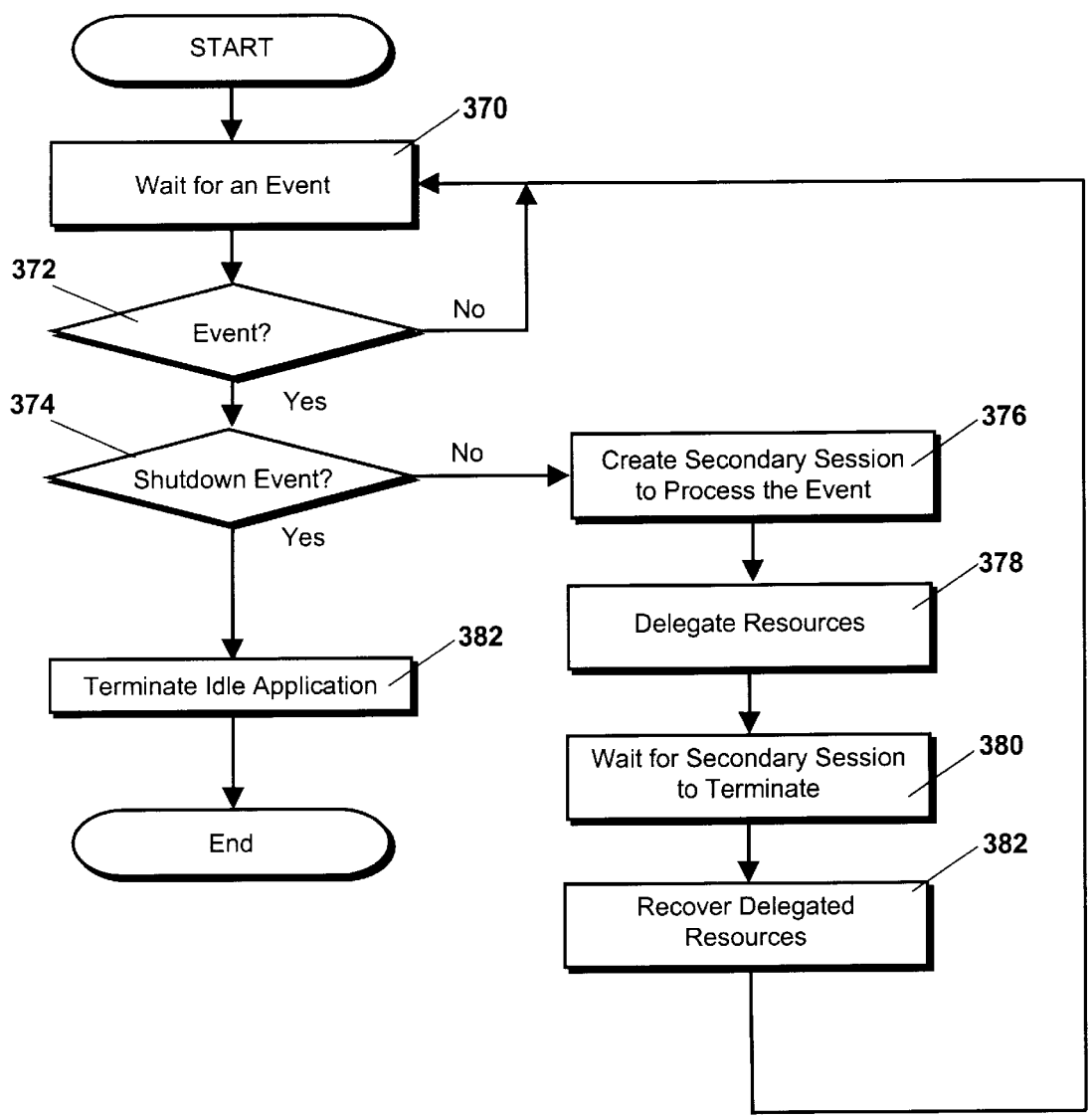
FIG. 14 is a flow chart illustrating the operation of an idle application in accordance with a preferred embodiment of the present invention.
Figure 15:
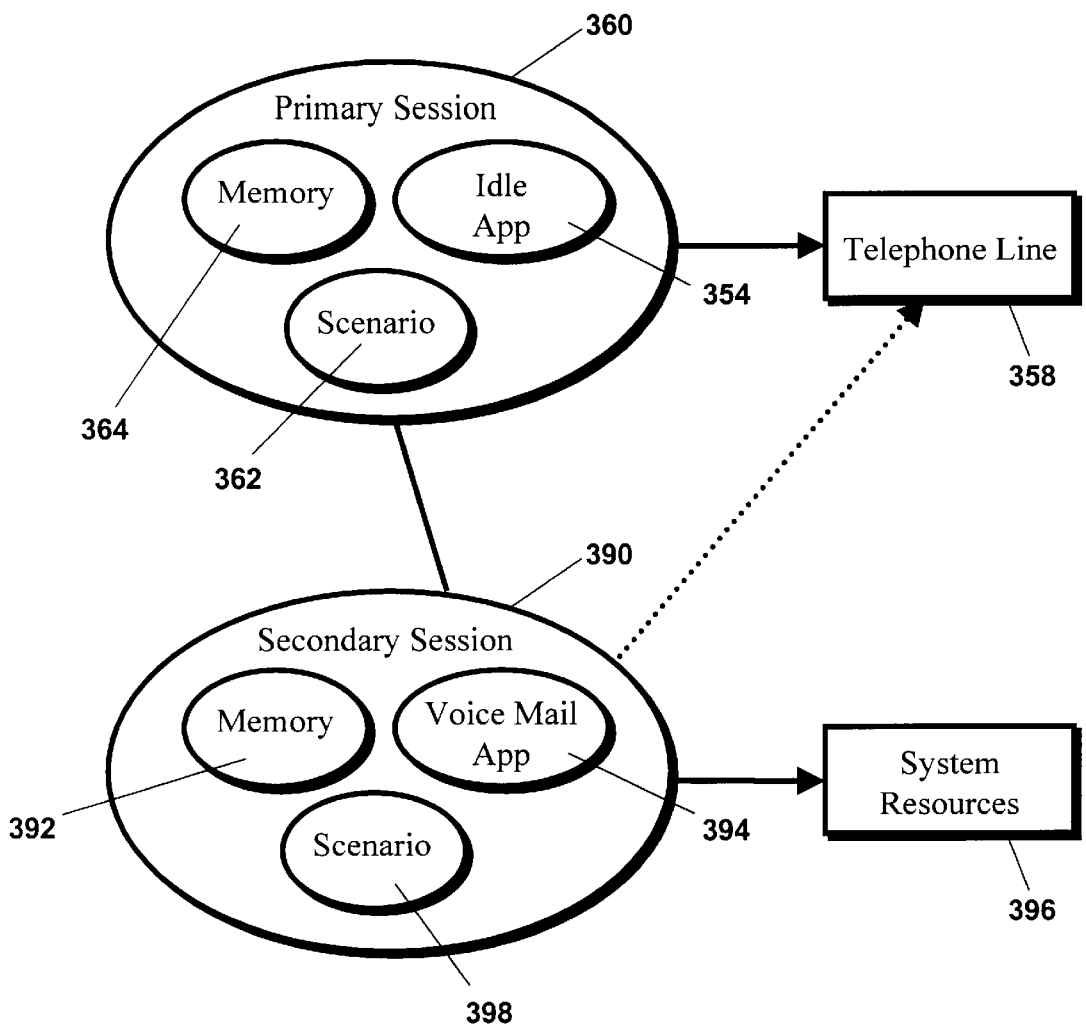
FIG. 15 is a diagram illustrating a primary and a secondary session of a preferred embodiment of the present invention.

Operation of the idle application 354 will now be described with reference to FIGS. 14 and 15. As discussed above, when a telephone line resource 358 is allocated to the primary session 360, the idle application 354 is sent to the primary session 360 and is executed on the primary session's thread. If the telephone line resource 358 is not available from the resource manager, an error is written to an event log and the application ends. If the telephone line resource 358 is available, the idle application 354 marks the telephone line 358 as inheritable and registers the telephone line 358 with the job queue. An interrupt mask is set to wake up when a job or shutdown event is received by the telephone line 358. At step 370, the idle application 354 waits for an event to occur in accordance with a scenario 362, such as an incoming call. As discussed above, the scenario 362 includes a plurality of events, each of which is mapped to one of a plurality of applications. When an event occurs, and it is a shutdown event (steps 372 and 374) the idle application terminates at step 382.

When an event occurs and it is not a shutdown event, the idle application 354 launches a secondary session 390 at step 376 in which the event will be processed. Before creating the secondary session, the idle application 354 locates a default user agent from the configuration manager, creates an application object based on the configuration of the line, and inserts the default user agent into the application object's data structure. The user agent includes a scenario 398 which will be used to define the behavior of the secondary session 390. The idle application 354 then creates the secondary session 390 at step 378. At step 380, the idle application 354 delegates the telephone line 358 to the secondary session 390, and sends a message to the secondary session 390 including the application object. Once created, the secondary session 390 waits for the message, receives the application, such as a voice mail application 394, and executes it. When it is done, it waits for another message, and if none is received, it terminates at step 380. Next, the idle application 354 recovers the delegated telephone line resource 358 used by the secondary session 390 at step 382, and then waits for the next event to occur.

As should be apparent, the idle application 354 operates to ensure that the primary session 360 regains control of the telephone line 358 and any other resources delegated to the secondary session 390. When the secondary session 390 terminates, it releases its memory 392 and any other system resources 396 allocated to the secondary session 390. However, as discussed above, the secondary session 390 cannot release resources that were delegated from other sessions, such as the telephone line 358 which was delegated to the secondary session 390 by the primary session 360. When the primary session 360 terminates, it will release the telephone line 358, as well as its memory 364.

Because the idle application only performs a few simple functions (e.g., wait for an event, launch second session, cleanup after second session, shutdown) the code needed to create the idle application will be relatively small and relatively easy to debug; thus, a person of ordinary skill in the art can write an idle application that will release its own system resources. In addition, because the idle application is the only application that executes on the primary session, the primary session is not exposed to the danger of executing an untested, incompatible, or otherwise unstable application that could cause the system to become unstable. Thus, cleanup of the resources delegated to the secondary session is virtually guaranteed.

Having thus described a preferred embodiment of the Computer Telephony System and Method, it should be apparent to those skilled in the art that certain advantages of the within system have been achieved. It should also be appreciated that numerous modifications, adaptations, and alternative embodiments thereof may be made within the scope and spirit of the present invention. The above description is presently the best contemplated mode of carrying out the invention. This illustration is made for the purpose of illustrating the general principles of the invention, and is not to be taken in a limiting sense. The scope of the invention is best determined by reference to the following claims.

What is Claimed is:

1. In a computer telephony system for providing integrated telephone and data applications, said computer telephony system including a computer having a processor and a memory, a software architecture implemented on said computer comprises:

a plurality of global objects including a resource manager for managing a plurality of system resources;

a primary session having a first thread of execution on said processor and controlling a first subset of said memory and at least one of said plurality of system resources; and an idle application for controlling said primary session, said idle application operable to detect a call processing event relating to said at least one system resource controlled by said primary session;

wherein said idle application creates a secondary session for each detected call processing event, said second session having a second thread of execution on said processor and controlling a second subset of said memory and said at least one system resource; and wherein said idle application controlling said primary session monitors said secondary session, said idle application operating to recover said at least one system resource upon a termination of said secondary session.

2. The software architecture of claim 1 further comprising:
   a multitasking operating system running on said computer; and
   a main application executing on said operating system for creating said plurality of global objects and for creating a main session having a third thread of execution on said processor and controlling a third subset of said memory.

3. The software architecture of claim 2 wherein said main application launches a voice mail application on said main session, said voice mail application operating to create said primary session.

4. The software architecture of claim 3 wherein said plurality of resources includes a plurality of telephone lines.

5. The software architecture of claim 4 further comprising a plurality of primary sessions created by said voice mail application, each of said plurality of sessions controlling a corresponding one of said plurality of telephone lines.

6. The software architecture of claim 5 wherein said plurality of global objects further comprises:
   a configuration manager for setting system wide properties of said computer telephony system.

7. The software architecture of claim 6 wherein said plurality of global objects further comprises:
   an internal database manager for controlling databases utilized by said computer telephony system.

8. The software architecture of claim 7 wherein said internal database manager comprises:
   a user agent database for storing data representing a plurality of user agents, wherein each user agent represents a known user of the computer telephony system and includes a scenario defining a plurality of event-application maps.

9. The software architecture of claim 8 wherein each of said plurality of primary sessions includes one of said plurality of user agents, and wherein said second session created by said idle application of one of said primary sessions upon detecting an event, executes an application corresponding to said detected event in accordance with the event-application maps of said scenario.

10. A method for providing a stable runtime environment in a computer telephony system having a plurality of system resources and a computer including a processor and a memory running a multitasking operating system, said method comprising the steps of:
    selecting at least one of said plurality of system resources;
    creating a first session for controlling said at least one system resource, said first session including a first thread of control on said processor and controlling a first subset of said memory, said first session further including a scenario defining a behavior of said first session through an event-application map;
    executing an idle application on said first session, said idle application operable to detect a call processing event relating to said at least one system resource;
    identifying a call processing event on said first session in accordance with said scenario;
    creating a second session for executing an application associated with said call processing event in accordance with said scenario, said second session including a second thread of control on said processor and controlling a second subset of said memory and said at least one system resource; and
    monitoring the behavior of said second session with said idle application in said first session, said idle application operating to recover said at least one system resource upon the termination of said second session.

11. The method of claim 10 further comprising the following step after the step of creating a second session:
    sending a message from said first session to said second session including said application and said at least one system resource, wherein said second session further includes a session queue in which it receives said message from said first session.

12. The method of claim 11 further comprising the following steps before the step of selecting:
    executing a main system program; and
    creating a plurality of global objects, including a resource manager for managing said plurality of system resources.

13. The method of claim 12 wherein said plurality of system resources includes a plurality of telephone lines.

14. The method of claim 13 wherein said step of creating a first session further comprises:
    creating a first session for each of said plurality of system resources, each of said first sessions including a first thread of control on said processor and controlling a first subset of said memory, each of said first sessions further including a scenario defining a behavior of its respective first session through an event-application map.

15. The method of claim 14 wherein said idle application executes steps comprising:
    waiting for an event that requires processing in accordance with the scenario of its respective first session;
    creating said second session when an event that requires processing is detected;
    sending a message to said session queue of said second session including an application to be executed on said second session in accordance with said scenario and said system resource controlled by said first session;
    waiting for said second session to terminate; and
    recovering said system resource and said second subset of memory upon the termination of said second session.

16. A computer telephony server for simultaneously implementing a plurality of messaging applications, said computer telephony server being connected to a plurality of telephone line resources, said computer telephony server comprising:
    a processor;
    a memory;
    a plurality of primary sessions, each of said primary sessions including a first thread of execution on said processor and controlling a first subset of said memory and one of said plurality of telephone line resources;
    an idle application implemented on each of said primary sessions, said idle application operable to detect a call processing event relating to said one telephone line resource controlled by the respective primary session;
    wherein said idle application creates a second session when a call processing event is detected, said second session including a second thread of execution on said processor and controlling a second subset of said memory and said one telephone line resource; and wherein said idle application monitors its respective second session, said idle application operating to recover said one telephone line resource when its respective second session terminates.

17. The computer telephony server of claim 16 further comprising a plurality of slots connected to said processor through a high-speed bus, each of said plurality of slots being adapted to receive an interface card for connecting said computer telephony server to one of said plurality of telephone line resources.

18. The computer telephony server of claim 17 further comprising a plurality of global objects implemented on said server, said plurality of global objects including a resource manager for managing said plurality of telephone line resources.

19. The computer telephony server of claim 18 wherein each of said secondary sessions further comprises a scenario defining a behavior of its respective secondary session through an event-application map.

20. The computer telephony server of claim 19 wherein each of said primary sessions terminates when its respective idle application stops executing.

* * * * *